US005401596A

United States Patent [19]
Stoilov et al.

[11] Patent Number: 5,401,596
[45] Date of Patent: Mar. 28, 1995

[54] HERMETICALLY SEALED DRY ACCUMULATOR

[76] Inventors: Georgi T. Stoilov; Vladimir G. Stoilov, both of 1504 Sofia, 64 "Yanko Bakazov" Boul., Bulgaria; Boiko G. Stoilov, 29130 Alhaokin de la Torre, Malaga, Spain; Christo T. Chervenkov; Pavel A. Lazov, both of 1504 Sofia, 64, "Yanko Bakazov" Boul., Bulgaria

[21] Appl. No.: 960,131

[22] Filed: Oct. 13, 1992

[30] Foreign Application Priority Data

Oct. 14, 1991 [BG] Bulgaria ................................ 95317
Oct. 14, 1991 [BG] Bulgaria ................................ 95318
Oct. 14, 1991 [BG] Bulgaria ................................ 95319

[51] Int. Cl.$^6$ .......................................... H01M 6/18
[52] U.S. Cl. .................................. 429/191; 429/220; 429/221; 429/222; 429/223; 429/204; 429/228; 429/227; 429/234; 429/229; 429/190
[58] Field of Search ............... 429/190, 191, 204, 205, 429/225, 226, 227, 228, 234, 245, 220, 222, 223; 29/623.2

[56] References Cited

U.S. PATENT DOCUMENTS

| | | | |
|---|---|---|---|
| 3,553,017 | 1/1971 | Morrill | 136/6 |
| 3,711,332 | 1/1973 | Bastacky | 136/26 |
| 3,870,563 | 3/1975 | Ruben | 136/26 |
| 3,964,927 | 6/1976 | Villarreal-Dominguez | 136/26 |
| 4,006,035 | 2/1977 | Mao | 429/72 |
| 4,076,909 | 2/1978 | Lindstrom | 429/207 |
| 4,081,899 | 4/1978 | Thornton | 29/623.2 |
| 4,140,840 | 2/1979 | Ruben | 429/190 |
| 4,221,854 | 9/1980 | Hammar et al. | 429/234 |
| 4,251,608 | 2/1981 | Ruben | 429/205 |
| 4,286,362 | 9/1981 | Hammar et al. | 29/2 |
| 4,317,872 | 3/1982 | Varma | 429/190 |
| 4,391,038 | 7/1983 | Kishimoto et al. | 429/190 |
| 4,414,302 | 11/1983 | Jache et al. | 429/190 |
| 4,455,358 | 6/1984 | Graham | 429/190 |
| 4,464,446 | 8/1984 | Berger et al. | 429/190 |
| 4,681,698 | 7/1987 | Graham | 252/182.1 |
| 4,687,718 | 8/1987 | Chreitzberg | 429/190 |
| 4,782,585 | 11/1988 | Kobayashi et al. | 29/623.5 |
| 4,863,816 | 9/1989 | Misra et al. | 429/190 |
| 4,871,428 | 10/1989 | Misra et al. | 204/2.1 |
| 4,889,778 | 12/1989 | Misra et al. | 429/190 |
| 4,929,251 | 5/1990 | Jache | 29/623.5 |
| 4,937,156 | 6/1990 | Boeller | 429/189 |
| 5,030,527 | 7/1991 | Carpio et al. | 429/192 |
| 5,128,218 | 7/1992 | Tokunaga et al. | 429/57 |

FOREIGN PATENT DOCUMENTS

28429 4/1980 Bulgaria .
29000 8/1980 Bulgaria .

OTHER PUBLICATIONS

N. A. Hampson et al., "The Electrochemistry of the Porous Lead Electrode in Sulfuric Acid" Journal of Power Sources 6 (1981) pp. 101–120.

N. Munichandraiah et al., "Insoluble Anode of Porous Lead Dioxide for Electrosynthesis: Preparation and Characterization", Journal of Applied Electrochemistry 17 (1987) pp. 22–32.

Edward Ghali et al., "Electrodeposition of Lead from Aqueous Acetate and Chloride Solutions:", Metallurgical Transactions, vol. 16B (1985) pp. 489–496.

(List continued on next page.)

Primary Examiner—José G. Dees
Assistant Examiner—Samuel Barts
Attorney, Agent, or Firm—Skadden, Arps, Slate, Meagher & Flom

[57] ABSTRACT

The invention is related to hermetically sealed dry accumulators having significantly larger power output per units of mass in a proportionately smaller volume. The accumulator includes one electrode comprising copper, cadmium, zinc, nickel, or iron, and another electrode of lead dioxide. An immobilized electrolyte containing a silica gel and sulfuric acid is in contact with the electrodes. A method for producing a novel silica gel which is especially suited for use in the immobilized electrolyte is also described.

16 Claims, 4 Drawing Sheets

OTHER PUBLICATIONS

F. P. Haver et al., "Aqueous Electrolysis of Lead Chloride", Bureau of Mines Report of Investigation No. 8276 from U.S. Dept. Interior (1978) pp. 1–11.

Provisionally Published German Federal Republic Patent Application No. 26 56 506, filed Dec. 14, 1976, "Positive Elektrode fur Bliakkumulatoren".

Provisionally Published German Federal Republic Patent Application No. 27 15 628, filed Apr. 7, 1977, "Positive Elektrode fur Bleiakkumulatoren".

Provisionally Published German Federal Republic Patent Application No. 28 49 311, filed Nov. 14, 1978, "Verhfahren zur Herstellung Positive and Negative Elektroden fur Bleiakkumulaatoren".

Provisionally Published German Federal Republic Patent Application No. 25 41 239, Filed Sep. 16, 1975, "Elektrischer Akkumulator".

German Federal Republic Patent Application Published in Opposition Auslegesschrift No. 2044972, filed Sep. 11, 1970, "Geschlossener Akkumulator".

Provisionally Published Federal Republic Patent Application No. 32 33 423; filed Sep. 9, 1982; Published Mar. 15, 1984.

HERMETICALLY SEALED DRY ACCUMULATOR

FIELD OF THE INVENTION

The invention relates to a hermetically sealed dry accumulator that is suitable for use as a direct current source of everyday and industrial application.

BACKGROUND OF THE INVENTION

Lead acid accumulators are widely used to convert chemical energy into electrical energy and conversely, to store electrical energy. The lead acid accumulators generally consist of positive and negative electrodes and electrolyte—sulfuric acid, housed in a hard rubber or plastic case.

The disadvantages of standard lead acid accumulators are well known. Lead acid accumulators require routine filling of their cells with water. The lead acid accumulators are relatively large and heavy for the amount of electrical energy, which they accumulate.

Electrical accumulators having a negative electrode made of iron, cadmium, magnesium, indium or zinc, a positive electrode made of lead dioxide, and electrolyte, which includes an aqueous solution of an alkaline hydroxide and a metallic sulfate, are also known. The alkaline accumulator is inherently limited because its operation depends on an alkaline electrochemical reaction with a salt that forms a weak electrical linkage with the positive electrode.

Consequently, the alkaline accumulator has a relatively small specific power output and must be made relatively large and heavy to produce a given amount of electrical energy.

Thus, there is a need for a hermetically sealed dry accumulator, having a significantly larger power output per unit of mass and a proportionately smaller volume. Ideally, the improved accumulator would contain relatively less lead, would weigh considerably less than conventional accumulators and would demonstrate a longer service life. An accumulator that contains less lead would be simpler to make and would involve the production of less environmentally damaging by-products.

SUMMARY OF THE INVENTION

A hermetically sealed dry accumulator in accordance with the present invention comprises a case having a negative electrode coated with copper, cadmium, zinc, nickel or iron and a porous lead dioxide positive electrode. Between and in contact with the positive and negative electrodes is an electrolyte comprising a silica gel which is infused with a solution containing concentrated sulfuric acid saturated with a metallic sulfate, corresponding to the selected metal coating the negative electrode. For example, in one form of the invention, the coating of the negative electrode is copper and the solution contains copper sulfate. The case which contains the silica gel and the electrolyte may be hermetically sealed.

The present invention provides a method for making a hermetically sealed dry accumulator which comprises installing a negative electrode composed of a metal selected from the group consisting of copper, cadmium, zinc, nickel, iron, and a porous lead dioxide positive electrode in an acid resistant case adapted to hold a liquid; placing finely ground silica gel in the case and around the electrodes in an amount sufficient to surround the electrodes and form a bed of silica gel; injecting into the bed a volume of saturated solution containing concentrated sulfuric acid and an amount of metallic sulfate of the metal of the negative electrode, sufficient to thoroughly wet the silica gel; and hermetically sealing the case.

Further objects, features and advantages of the present invention will be apparent from the following description and drawings.

DETAILED DESCRIPTION OF THE PREFERRED EMBODIMENTS

Figure 1:
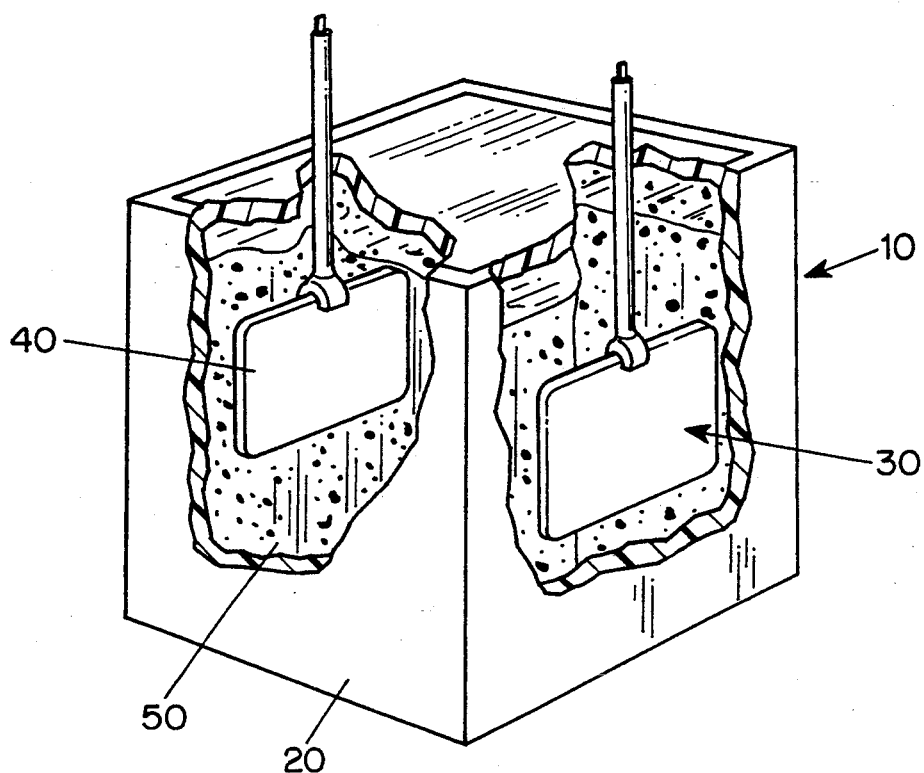
FIG. 1 is a view of a hermetically sealed dry accumulator constructed in accordance with the present invention.
Figure 3:
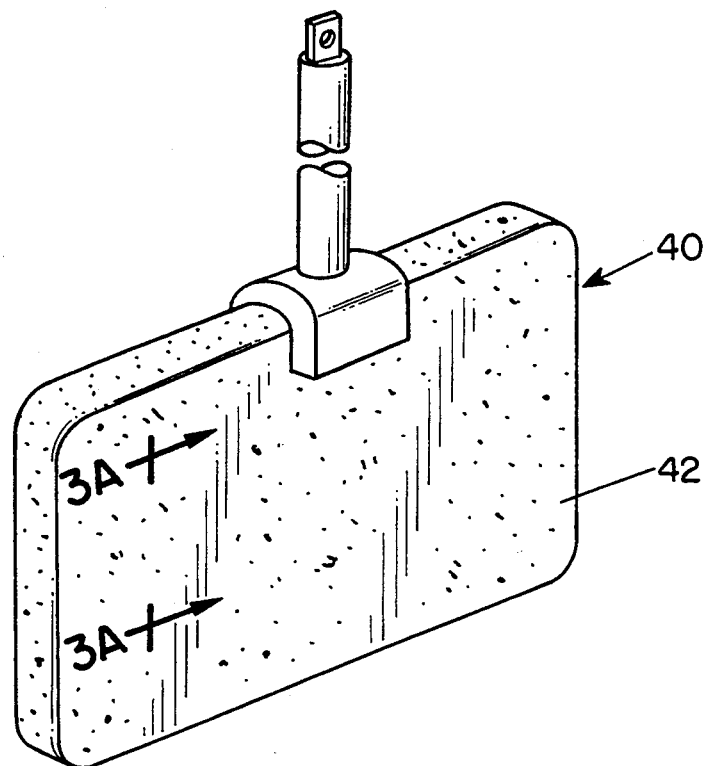
FIG. 3 is a perspective view of a positive electrode.

Referring now to the drawings, a hermetically sealed dry accumulator 10 in accordance with the present invention includes a case 20 having a top, a bottom and four sides. Case 20 may be constructed of any of the conventionally used, acid-resistant plastic materials. Synthetic resins are preferred in the case construction. The main features of suitable plastics are: structural strength, impact strength, wear resistance when contacting and sliding on hard objects, low specific weight, chemical stability when contacting sulfuric acid and minimal aging when contacting the environment (air, moisture, atmosphere). Materials such as polyvinylchloride and polyethylene are preferred. The case may be also constructed of hard rubber.

A negative electrode 30 is mounted in the case 20. Electrode 30 is made of a metal selected from the group consisting of copper, cadmium, zinc, nickel and iron and may include several physically separated plates which are electrically connected. The selected metal may be present in the form of a coating 32. A grid is embedded in electrode 30 which provides structural support but which does not actually take part in the chemical reaction. The grid may be composed of plastic or ceramic material and optionally may be reinforced with an aluminum mesh armature.

For example, the grid may be an assembly of aluminum rod-like elements having diameters in the range of about 0.8 to about 1.5 mm which intersect in a plane to define a plurality of substantially square apertures each about 1.5 mm wide. Cadmium and copper, although more expensive than aluminum, can also be used as grid materials.

Figure 2:
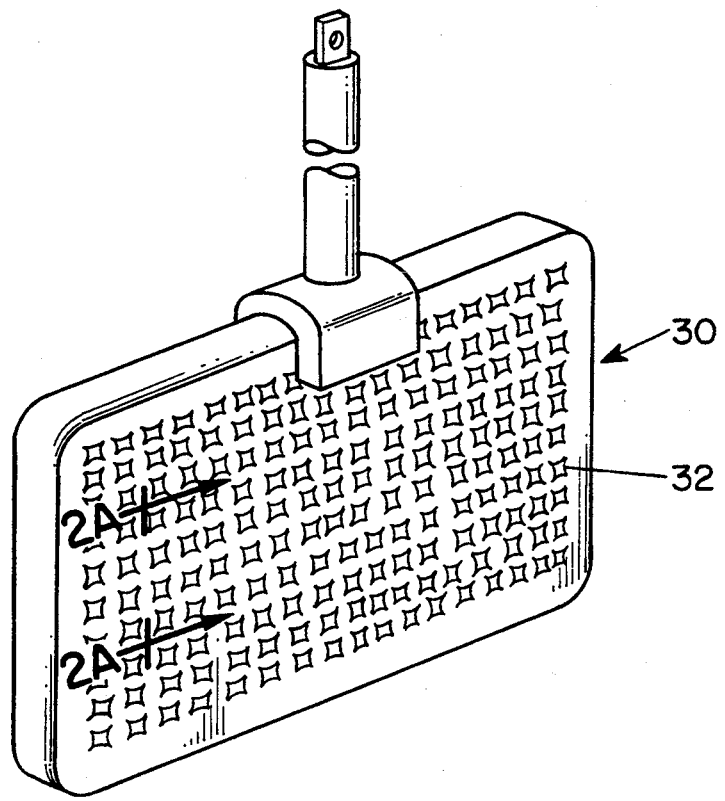
FIG. 2 is a perspective view of a negative electrode.
Figure 2A:
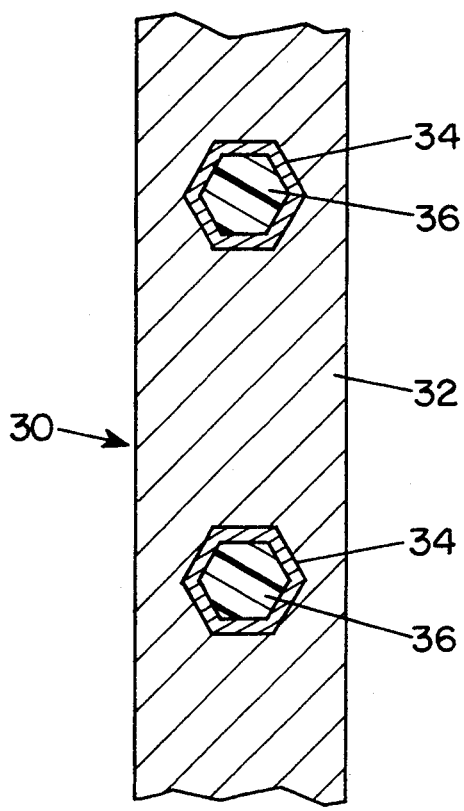
FIG. 2A is an enlarged. cross-sectional view of the negative electrode of FIG. 2 taken along line 2A—2A of FIG. 2.
Figure 3A:
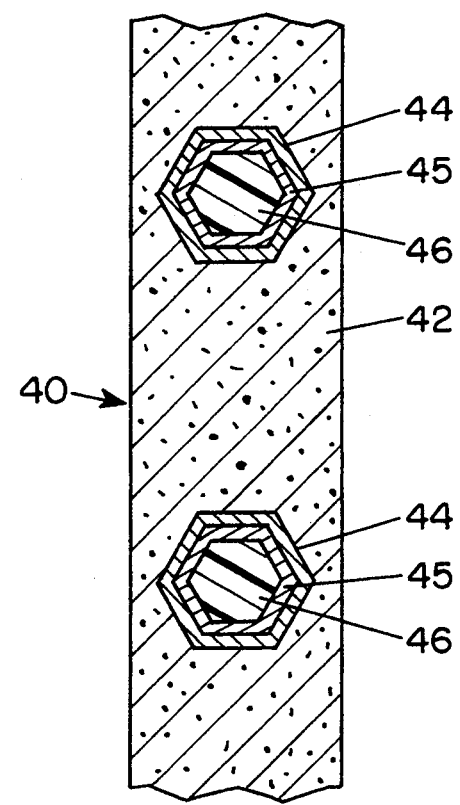
FIG. 3A is an enlarged cross-sectional view of the positive electrode of FIG. 3 taken along line 3A—3A of FIG. 3.
Figure 4:
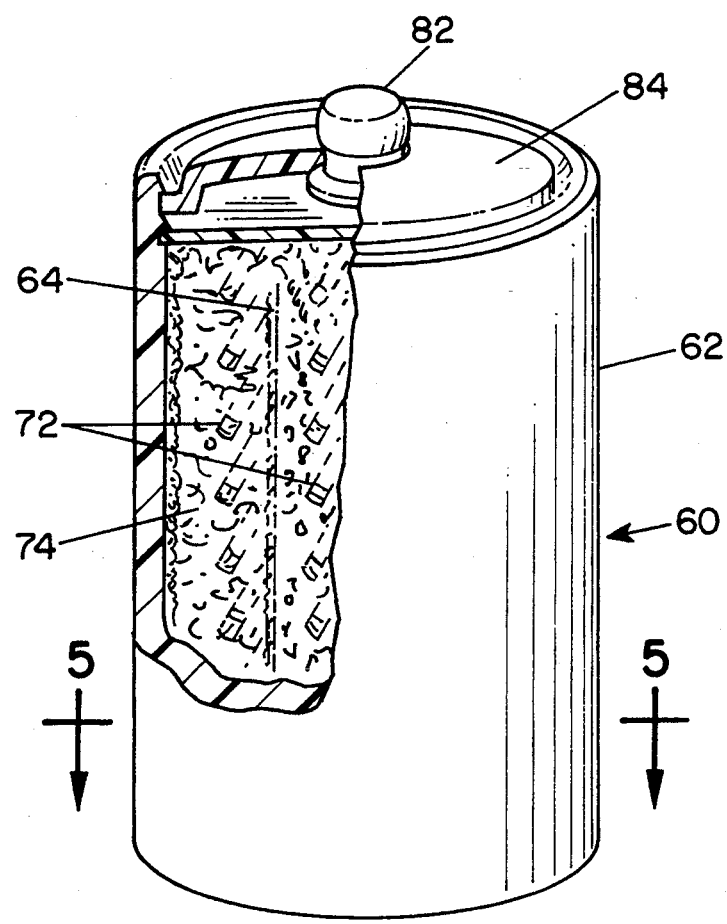
FIG. 4 is a cut-away perspective view of a hermetically sealed dry accumulator constructed in accordance with this invention.
Figure 5:
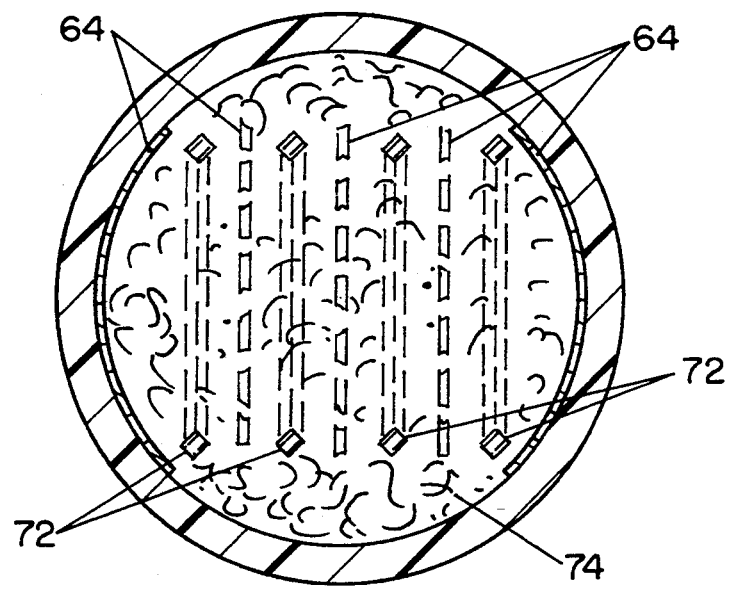
FIG. 5 is a cross-sectional view of an accumulator taken along line 5—5 of FIG. 4.

Alternatively, as shown on FIG. 2A, the negative electrode may include a non-metallic grid, such as a plastic grid 36, having a thin layer of nickel 34 and a coating 32 of the selected metal. The grid 36 is formed by rod-like elements, which have cross sections generally circular, polygonal or square with flat areas extending lengthwise on the rod-like elements. Preferably, the plastic rod-like elements are about 1.5 mm in thickness and intersect to define substantially square apertures about 1.5 mm wide. It is necessary to coat the plastic grid 36 with an initial layer 34 of nickel about 5 microns in thickness even though an outmost coating is composed of a selected metal other than nickel.

If the selected metal is copper, the coating 32 preferably has a thickness in the range of about 5 to about 10 microns. The thickness of the coating 32 is preferably about 20 microns for cadmium and zinc, about 5 to 10 microns for nickel, and about 20 to 30 microns for iron.

The coating and the thin layer 34 of nickel may be applied by well-known metallizing processes. Vacuum deposition processes, such as sputtering and chemical vapor deposition are preferred.

The hermetically sealed dry accumulator 10 also employs a lead dioxide positive electrode 40 which preferably is a porous lead dioxide electrode. A porous lead dioxide layer 42 constitutes the active mass for the positive electrode.

A much preferred lead dioxide electrode and the method by which it is made are described in our concurrently filed patent application entitled "Method For Making Porous Lead Electrodes." That porous lead electrode preferably comprises a plastic grid 40 surrounded by a layer of nickel 45, having a thickness of about 5 microns and covered by coating 44 of lead having a thickness of about 200 microns and then covered with the porous lead dioxide layer 42. The plastic grid 46 is constructed of a synthetic plastic material such as polyethylene chloride, polypropylene or polyvinyl-chloride. Polyethylene chloride is the preferred grid material.

That electrode is preferably made by a process including the steps comprising providing a plastic or ceramic grid, coating the grid by a thin layer of nickel, such as a 5 micron layer which is covered by a thin layer of lead, such as 200 microns thick, molding a paste containing water and a halogenated lead compound, such as lead chloride, upon the lead layer, submerging the paste covered grid in an electrolyte solution in which an aluminum or magnesium electrode is also submerged, electrically reducing the halogenated lead compound to form a highly porous lead layer, and electrically oxidizing the porous lead layer in an aqueous hydrochloric acid solution to produce a porous lead dioxide electrode. The paste is preferably a mixture of powdered lead chloride and water, and is applied in a thickness of about 200 microns to occlude the metal-covered plastic grid holes.

Electrolyte 50 is dispersed in the case 20 between and in contact with the negative electrode 30 and the positive electrode 40. The electrodes are preferably immersed in the electrolyte. The upper ends of the electrodes extend out of the electrolyte and are either connected to electrical conduit terminals or are utilized as terminals themselves. The electrodes or the electric conduit terminals extend outwardly through the top of the case.

The electrolyte includes a porous and highly absorbent silica gel, the pores of which are infused with a liquid solution. It is preferred that the silica gel be sufficiently absorbent to allow the accumulator of the present invention to function in any position rather than being limited to operation in an upright position, as are accumulators containing a free electrolyte. Additionally, it is especially preferred that the silica gel be highly absorbent so as to be capable of absorbing any gases that might generate while the accumulator discharges or is charged with electricity. Preferably, the silica gel has a microgranulate structure and an active surface area in the range of about 600 to about 800 square meters per gram as measured by the Brunauer, Emmett Teller (B.E.T.) method.

A suitable silica gel may be the product of a chemical reaction between sodium silicate, also called water glass, and sulfuric acid. Alternatively, the silica gel may be produced by contacting a finely divided silicon dioxide with concentrated sulfuric acid. The silica gel may be also produced by the method described below, which furnishes a relatively high yield of silica gel having a microgranular structure as contrasted with methods which produce substantial amounts of particles that necessitate regrinding and subsequent chemical purification.

In the preferred method of making silica gel especially useful in the electrochemical cell of the present invention, a chemically pure solution of water-glass ($Na_2O_n \cdot SiO_2$) with a specific gravity of about 1.10 and a chemically pure solution of sulfuric acid having a specific gravity of about 1.20 are contacted in a proportion of about 100 to 15 parts by volume. The water-glass is poured onto the surface of the sulfuric acid while it is gently and continuously stirred in a glass vessel. A chemical reaction takes place between the water-glass and the sulfuric acid which produces water, sodium sulfate, and silica. Small particles of silica are produced in the aqueous solution and form a colloid.

The colloid is removed and placed on specially perforated dishes to hasten coagulation. The colloid is held at a temperature in the range of about 20° C. to about 25° C. for a period of about 24 hours during which the colloid, which had the appearance of a gelled mass, coagulates into a solid. The solid then is crushed between rollers to produce particles having a size distribution such that at least about 90% of the particles can pass through a 1 mm mesh sieve. The particles are maintained at a temperature of about 30° C. to 40° C., such as by infra-red lamps, with constant stirring until the particles of silica gel contain relatively little moisture.

The dried particles of silica gel are next treated with a 3 weight percent sulfuric acid solution and then washed with distilled water separately, as necessary, until essentially no sodium sulfate or sulfuric acid can be detected by conventional laboratory means in the wash water. The washed particles are separated from the wash water by filtration, preferably vacuum filtration, and dried again, as in ovens fitted with infra-red lamps, at a temperature of about 100° C. for a period of from about 6 to about 10 hours. After the second drying, the silica gel particles are placed in air-tight plastic or glass vessels until use.

During operation the silica gel is infused with an oversaturated solution of metallic sulphate in concentrated sulfuric acid. It is preferred that the solution be chemically oversaturated with the metallic sulphate. If the hermetically sealed dry accumulator of the present invention is operated with a liquid solution that contains less than a saturating amount of the metallic sulphate the cell will exhibit relatively shorter service life. The liquid solution is prepared by adding concentrated sulfuric acid to metal sulphate at 90° C. while stirring. The resulting slurry is then cooled to room temperature and the supernatant liquid is drawn and employed as electrolyte.

To assemble the hermetically sealed dry accumulator, the case is partially filled with silica gel so that the surfaces of the electrodes are below the surface of the silica gel bed. The surface of the silica gel bed is maintained about 5 mm below the top in relatively small accumulators.

The liquid electrolyte is then injected below the surface of the silica gel with a syringe and the case is filled from the bottom up smoothly displacing air from the bead without agitating the silica gel until the surface of the bed begins to look wet, at which time the silica gel is suitably thoroughly wetted and at which time the silica gel is suitably thoroughly wetted and saturated. The case is left in this condition for about 6–12 hours to equilibrate. After essentially all of the air in the silica gel has been-displaced and the chemical reaction has ceased, the case may be hermetically sealed.

Prior to placing the hermetically sealed dry accumulator in operation, the accumulator is charged by a external surface of current.

Each of the selected metals and the associated metallic sulphate will produce a different voltage in a hermetically sealed dry accumulator as shown in Table 1. The tabulated voltages may be used as a guide in selecting electrode material combinations appropriate for a particular application.

TABLE 1

| Negative Electrode Material | Positive Electrode Material | Electrolyte Solution | Electromotive Force (Volts) |
|---|---|---|---|
| Copper | Lead dioxide | Copper sulfate and sulfuric acid | 1.5 |
| Cadmium | Lead dioxide | Cadmium sulphate and sulfuric acid | 2.2–2.4 |
| Nickel | Lead dioxide | Nickel sulphate and sulfuric acid | 1.6–1.7 |
| Zinc | Lead dioxide | Zinc sulphate and sulfuric acid | 2.4–2.5 |
| Iron | Lead dioxide | Iron sulphate and sulfuric acid | about 1.0 |

Figure 6:
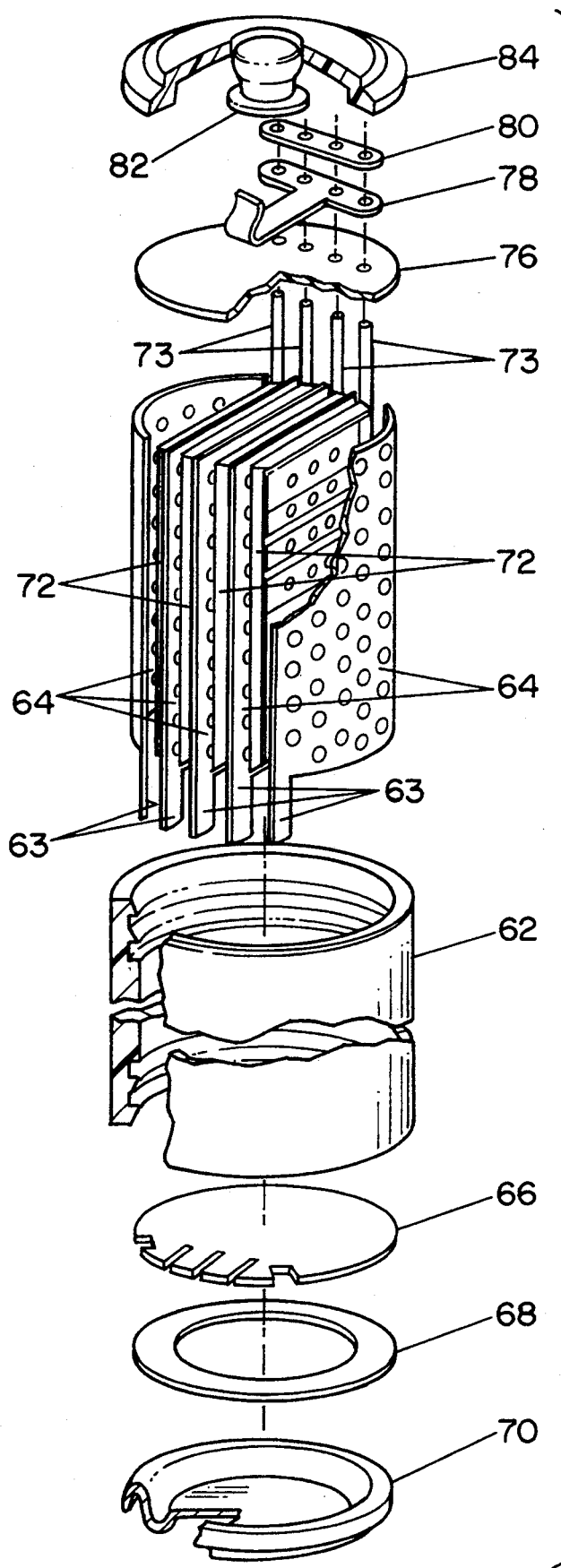
FIG. 6 is an exploded perspective view of the accumulator of FIG. 4, with the silica gel omitted for clarity.

FIG. 6 is an exploded view of an accumulator 60 made in accordance with the present invention having a cylindrical case 62 that encloses a negative electrode formed by five copper plates 64 which are electrically connected. The case 62 is about 60 mm long and about 30 mm in diameter. The plates 64 are composed of solid copper foil having a thickness in the range of about 0.2 mm and are shaped generally as rectangles, about 45 mm long and 20 mm wide.

Preferably, the plates 64 are supported at their edges by the case 62 and are held approximately parallel about 6 mm from each other.

The plates 64 have a plurality of holes, each having a diameter of about 2 mm, so as to facilitate movement of particles and fluids within the case 62. The holes may be formed by a punching method.

Each of the plates 64 comprising the negative electrode is generally rectangular and has a bendable, integral extension 63. The extensions are threaded through apertures made in the lower washer 66 which is disposed across one end of the case 62, are bent into proximity with each other on one side of the lower washer 66, and are soldered together, so as to electrically join all five of the plates 64. A lower cap 70, constructed of or coated by an electrically conducting material and provided with sealing means 68 contacts the soldered extensions 63 of the plates 64 and mates with the case 62 to create a hermetic seal.

Between the plates 64 are disposed four gratings 72 which are electrically connected to act as a single positive electrode. The grating 72 is generally rectangular and has a rigid integral extension 73, suitable for making electrical contact. The grating 72 may define rectangular apertures having a width of about 5 mm and a length of about 19 mm. Each grating 72 includes a plastic frame covered by a thin layer of nickel, coated by a thin layer of lead which is surrounded by a porous lead dioxide layer. The layer of nickel and is preferably, about 5 microns in thickness and the thin layer of lead is about 200 microns in thickness.

A bed of silica gel 74 thoroughly wetted with an electrolyte and, preferably, made in accordance with the process described herein is disposed around and between the plates 64 and gratings 72. The silica gel 74 covers substantially all of the rectangular portion of the plates 64 and gratings 72.

An upper washer 76 extends across one end of the case 62 and retains the silica gel 74 in proximity with the plates 64 and the gratings 72. Extensions 73 of the gratings 72 pass through apertures defined by the upper washer 76 and are joined to conductive soldering bridges (78 and 80). The bridges are in physical contact with an electrically conductive insert 82 which is press-fitted into and extends through an aperture in an upper cap 84 and may be provided with sealing means, such as an O-ring. The cap 84 fits across and hermetically seals the upper end of the case 62.

It will be apparent to those skilled in the art from the foregoing that modifications may be made in the embodiments described without departing from the spirit and scope of the invention. Accordingly, the invention is not intended to be limited except as may be necessary in light of the following claims.

What is claimed is:

1. A hermetically sealed dry accumulator comprising:
  a case;
  a negative electrode within said case, said negative electrode comprising a metal selected from the group consisting of copper, cadmium, zinc, nickel and iron;
  a porous lead dioxide positive electrode within said case; and
  an electrolyte in contact with the positive and negative electrodes, said electrolyte including a solid silica gel infused with a liquid solution of concentrated sulfuric acid and a metallic sulfate, the metallic sulfate concentration in said liquid solution being at least a substantially saturating concentration.

2. The hermetically sealed dry accumulator of claim 1, and wherein said concentrated sulfuric acid is saturated with said metallic sulfate and the metal of said metallic sulfate is the same as the selected metal of the negative electrode.

3. The hermetically sealed dry accumulator of claim 2, further characterized in that the selected metal is copper and the solution is saturated with copper sulfate.

4. The hermetically sealed dry accumulator of claim 2, further characterized in that the selected metal is cadmium and the solution is saturated with cadmium sulfate.

5. The hermetically sealed dry accumulator of claim 2, further characterized in that the selected metal is zinc and the solution is saturated with zinc sulfate.

6. The hermetically sealed dry accumulator of claim 2, further characterized in that the selected metal is nickel and the solution is saturated with nickel sulfate.

7. The hermetically sealed dry accumulator of claim 2, further characterized in that the selected metal is iron and the solution is saturated with iron sulfate.

8. The hermetically sealed dry accumulator of claim 1, characterized in that the negative electrode comprises a non-metallic grid having an outer coating of the selected metal.

9. The hermetically sealed dry accumulator of claim 8, characterized in that the coating of the selected metal is applied by a vacuum deposition process.

10. The hermetically sealed dry accumulator of claim 8, characterized in that the non-metallic grid is composed of a synthetic plastic material.

11. The hermetically sealed dry accumulator of claim 1, characterized in that the negative electrode includes an aluminum mesh armature which is covered by a coating of the selected metal.

12. The hermetically sealed dry accumulator of claim 1, characterized in that the positive electrode includes a plastic grid, a thin layer of nickel which coated the plastic grid, a thin layer of lead which coats the thin layer of nickel and a layer of porous lead dioxide which covers the thin layer of lead.

13. The hermetically sealed dry accumulator of claim 1, characterized in that the silica gel is highly absorbent and the electrolyte is hermetically sealed in the case.

14. The hermetically sealed dry accumulator of claim 1, characterized in that the negative electrode includes a copper coated plastic grid;

the silica gel is thoroughly wetted with a concentrated solution of copper sulfate and sulfuric acid; and the case surrounding the thoroughly wetted silica gel is hermetically sealed and isolates the silica gel from the ambient atmosphere.

15. A hermetically sealed dry accumulator comprising:

a case;

a negative electrode within said case, said negative electrode comprising a metal selected from the group consisting of copper, cadmium, zinc, nickel and iron;

a porous lead dioxide positive electrode within said case; and an electrolyte in contact with the positive and negative electrodes, said electrolyte including a solid silica gel infused with a liquid solution of concentrated sulfuric acid and a metallic sulfate selected from the group consisting of copper sulphate, cadmium sulphate, zinc sulphate, nickel sulphate and iron sulphate, the metallic sulfate concentration in said liquid solution being at least a substantially saturating concentration.

16. The hermetically sealed dry accumulator of claim 1, wherein said liquid solution comprises at least a supersaturating solution of said metallic sulfate.

* * * * *